United States Patent [19]

Valcho et al.

[11] 4,122,020

[45] Oct. 24, 1978

[54] OIL RECOVERY AND MOBILITY CONTROL USING SUCCINATE SURFACTANT SYSTEMS

[75] Inventors: Joseph J. Valcho, Naperville; Robert E. Karll, Batavia, both of Ill.

[73] Assignee: Standard Oil Company Chicago, Ill.

[21] Appl. No.: 827,550

[22] Filed: Aug. 25, 1977

[51] Int. Cl.² .............................................. E21B 43/22
[52] U.S. Cl. ............................... 252/8.55 D; 166/274; 166/275; 252/354; 252/355
[58] Field of Search ................... 252/8.55 D, 354, 356; 166/273, 274, 275

[56] References Cited

U.S. PATENT DOCUMENTS

| | | | |
|---|---|---|---|
| 3,302,712 | 2/1967 | Townsend et al. | 166/273 |
| 3,469,630 | 9/1969 | Hurd et al. | 166/273 X |
| 3,500,912 | 3/1970 | Davis et al. | 166/275 X |
| 3,827,497 | 8/1974 | Dycus et al. | 252/8.55 X |
| 3,977,471 | 8/1976 | Gale et al. | 166/273 |

*Primary Examiner*—Herbert B. Guynn
*Attorney, Agent, or Firm*—Mark J. DiPietro; Arthur G. Gilkes; William T. McClain

[57] ABSTRACT

A method is disclosed for moving and eventually recovering oil from a subterranean oil-bearing formation which comprises injecting into the formation an aqueous fluid containing a succinamate surface-active agent and method for mobility control (imparting viscosity) to a surfactant system used for recovery or moving of oil in an oil-bearing formation.

27 Claims, No Drawings

OIL RECOVERY AND MOBILITY CONTROL USING SUCCINATE SURFACTANT SYSTEMS

BACKGROUND OF THE INVENTION

1. Field of the Invention

The field of art to which this invention pertains is oil recovery methods using surfactants and mobility control of surfactant slugs in oil recovery processing. Relevant art is contained in U.S. Classification 166-273, 274, and 275.

2. Detailed Description of the Prior Art

Relevant prior art includes additive compositions including those characterized as water-insoluble mineral oil additives which are produced from the reaction of alkenyl-substituted succinic acid anhydrides and a tertiary amine as disclosed in U.S. Pat. No. 2,588,412. Oil-soluble polyvalent metal salts of an alkenyl-succinic acid monoamide are also disclosed in U.S. Pat. No. 2,458,425. Both of these patents are classified in U.S. Classification 260-561 and are limited to the use of such materials as additives for mineral oil or lube oil uses.

It has been recognized in the petroleum industry that oil recovery methods using surfactants can be used to effectively remove oil from a subterranean reservoir which has been subjected to straight water flooding or polymer flooding operations. Without the use of surfactants or materials which can help remove this oil from the interstitial spaces within the reservoir, it is essentially non-recoverable.

The art has also recognized that when using surfactants many problems exist when these materials are used in reservoirs of elevated temperatures (temperatures around 140° F. or higher). An especially acute problem which results when passing surfactants into high-temperature reservoirs is that they will lose viscosity and will not perform to their optimum capabilities. Accordingly, then, mobility control additives are useful when added to such surfactant materials. Such thickening agents include materials such as heteropolysaccharides produced by the bacteria of the genus Xanthomonas. More particularly, such materials are disclosed in U.S. Pat. No. 3,964,972.

The use of thickeners in surfactant slugs is disclosed, at least concerning using the polysaccharide materials, in U.S. Pat. No. 3,719,606 in which microemulsions of oil-soluble alkali metal sulfonates are used along with co-surfactants and from about 0.05 to about 1 percent by weight of a polysaccharide to enhance the viscosity of the microemulsion for improved oil recovery.

Some of the thickening agents now present on the market, including materials such as hydrolyzed polyacrylamides or copolymers of sodium acrylates or methacrylates and acrylamide, generally are not good candidates for use in surfactant slugs for oil recovery since in many instances these materials are not compatible with materials such as crude oil sulfonates, gas oil sulfonates or aliphatic polymer sulfonates. Many of the polyacrylamide-type materials when mixed with sulfonate surfactants precipitate forming coagulated gels which may increase the residual resistance of an oil-containing reservoir to a point that moving additional fluid through it becomes very difficult if not impossible.

Many of the thickeners used, such as the polysaccharides or other water-soluble polymers, themselves do not contain sufficient surfactant properties to be used in a surfactant slug without reducing the surfactant's ability to move oil unless additional surfactant is used.

It would therefore be advantageous to use water-soluble thickeners which also possess surfactant properties in order that an increase in the viscosity of a surfactant fluid could be attained without losing surfactant properties by dilution of the surfactant by the water-soluble polymer. Accordingly, the present invention attains this ideal situation by including, in one instance, in a surface-acting fluid a viscosity-enhancing additive material which also contains sufficient surfactant moieties in order to act both as a viscosity thickening agent and a surfactant agent.

In another instance, the present invention provides a surfactant which possesses sufficient viscosifying properties in order that it may be used by itself in certain instances for recovery of oil from oil reservoirs where high viscosity surfactants are necessarily needed.

SUMMARY OF THE INVENTION

The present invention can be summarized as a process for moving oil in a subterranean oil-bearing formation by contacting the formation with an aqueous fluid containing a succinate surface-active agent having the following general formula:

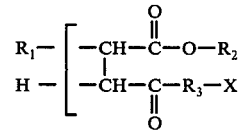

wherein $R_1$ is alkenyl; $R_2$ is selected from $NH_4$, metal cations such as alkali metals, lower alkyls, hydroxyl-substituted lower alkyls and hydroxyl-substituted ethoxylated lower alkyls; $R_3$ is selected from O or $O-SO_3$; and X is a cation.

The present invention can also be summarized as a process for moving oil in a subterranean oil-bearing formation which comprises contacting said formation with an aqueous fluid containing an anionic surfactant which incorporates as an improvement in the process an amount of a succinamate surface-active agent having the above general formula to enhance the viscosity of the resulting aqueous fluid for improved oil recovery from said reservoir.

It is an object of the present invention to present a process for moving oil from a subterranean oil-bearing formation by using a surface-active agent comprising an alkenyl succinate compound.

It is another object of the present invention to provide increased viscosity to an aqueous fluid which contains an anionic surfactant, especially sulfonate materials, which comprises incorporating into the aqueous fluid containing said surface-active agent an additional surface-active agent also containing viscosifying properties which comprises an alkenyl succinate surface-active agent.

In a broad embodiment, the present invention resides in a process for moving oil from an oil-bearing formation which comprises injecting into the formation an aqueous fluid containing an effective amount of succinate surface-active agent having the following general formula:

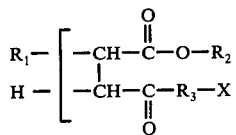

wherein $R_1$ is alkenyl having an average molecular weight in the range of from about 150 to 600; $R_2$ is selected from $NH_4$, metal cations such as alkali metals, lower alkyls, hydroxyl-substituted lower alkyls, hydroxyl-substituted ethoxylated lower alkyls; $R_3$ is O or $OSO_3$; and X is a cation.

Another embodiment of our invention resides in a process for moving oil from an oil-bearing formation which comprises injecting into the formation an aqueous fluid containing an effective amount of an anionic surfactant, an improvement in such process which comprises incorporating into the aqueous fluid an effective amount of succinate surface-active agent having the following general formula:

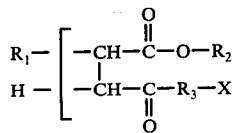

wherein $R_1$ is alkenyl having an average molecular weight in the range of from about 150 to about 600; $R_2$ is selected from $NH_4$, metal cations, lower alkyls, hydroxy-substituted lower alkyls, hydroxyl-substituted ethoxylated lower alkyls; $R_3$ is O or $OSO_3$ and X is a cation.

These and other objects and embodiments of the present invention will be more fully explained after a review of the below detailed description of the invention.

DETAILED DESCRIPTION OF THE INVENTION

The succinate surface-active agent incorporated as a surfactant for for recovery of oil from oil-bearing formations or when used in conjunction with another anionic surfactant (preferably sulfonates) to increase the viscosity of such material is generally selected and represented by the following general formula:

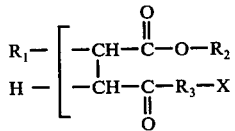

The $R_1$ substituent in the above formulation is generally an alkenyl material having an average molecular weight of from about 150 to about 600. In particular, this material can be produced as an aliphatic polymer from the cationic polymerization of olefinic materials such as butene-1, or butene-2, or mixtures thereof. Depending upon the extent of polymerization and the catalyst and reaction conditions utilized, the $R_1$ substituent will possess a varying range of molecular weights. It is necessary that the molecular weight range of the $R_1$ substituent along with the $R_2$ and $R_3$ substitutents be selected so as to not unduly interfere with the solubility of the above succinate for both oil and water. A certain balance of solubility for water and oil is needed when this material is used either as a surface-active surfactant by itself or in conjunction with an anionic surfactant as a thickening agent possessing surfactant properties.

In some instances the $R_1$ alkenyl substituent itself can have radicals substituted thereon and still be considered an overall alkenyl substituent. For instance, there may be side chains of lower alkyl radicals or halide or other substituents present on this material as long as it does not unduly interfere with the basic property of this material, that is, possessing sufficient molecular weight for use in the present invention.

Especially useful $R_1$ substituents include materials produced from viscous polybutene polymers having average molecular weights, depending upon their source. Materials specifically contemplated will have average molecular weights of around 280, 320, 340, and 420. These specific molecular weights are those from commercially available viscous polybutenes. However, other sources of such viscous polymers are not precluded, as are other molecular weight materials in variance from those described above.

The $R_2$ substituent is selected from $NH_4$, metal cations such as alkali metals, lower alkyls, that is, materials generally having less than about 7 carbon atoms per molecule, hydroxyl-substituted lower alkyls and hydroxyl-substituted ethoxylated lower alkyls, etc. In particular, materials which can comprise the $R_2$ substituents include materials such as normal and isopropyl radicals, normal butyl radicals, ethyl radicals, which themselves may contain hydroxyl substituents, variously ethoxylated amyl alcohols, or mixtures thereof. For maintaining good oil solubility it is preferred that the $R_2$ substituent be a lower alkyl or a substituted alkyl as described above.

The $R_3$ substituent is generally selected from O or $OSO_3$ radicals depending upon the particular synthesis involved in production of the succinate material.

In the above formula X is represented as a cation and can be selected from those cations known in the art including alkali metals such as sodium, potassium, lithium, materials such as ammonium, or cations formed from primary, secondary or tertiary amines $NH_3NH_2+$, ammonium, $RNH_3-$,

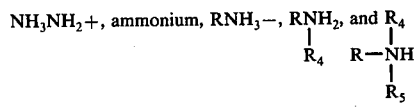

where R, $R_4$, and $R_5$ are selected from lower alkyl, or other cations known in the art.

The succinates described above can generally be prepared from the "ENE" reaction of maleic anhydride with an olefin such as polybutenes or polypropylene os average molecular weights of from about 100 to about 600 or greater. The resulting alkenyl succinic anhydride is preferably then reacted with from anywhere from about 0.7 to about 1.6 equivalents of an alcohol to give an intermediate half-acid, half-ester material. This adduct can then be neutralized with caustic, ammonia or amines (0.8 to 1.0 equivalents) to give the succinate product as illustrated in the structure above.

When using the claimed succinate as the primary surface-active agent in miscible flooding for recovery of crude oil from underground formations, it is preferable to mix such surfactant with the connate water recovered from the reservoir or from the brine available from other sources. The aqueous mixture of succinate in the brine is then pumped into a reservoir under well-known operating conditions to cause enhanced recovery of oil from the reservoir. Specifically, concentrations of the succinate in the brine can vary on a weight basis of anywhere from a few to 25 or more weight percent of the total aqueous surfactant mixture injected into the formation. Additional components can be added to the aqueous mixture. These include cosurfactant materials known in the art including water-soluble alcohols such as isopropyl alcohol, the oil-soluble alcohols containing no more than about 10 carbon atoms, and the 2 to 12 mole ethylene oxide adducts of primary alcohols and amines having from 4 to 16 carbon atoms, including such materials as n-butanol, 2-ethylhexanol, n-hexanol, n-octanol, n-decanol, and the like. In general, it is preferred to use the 6 to 8 mole ethylene oxide adducts of n-hexanol. Other cosurfactant materials can be used and are well known in the art.

The cosurfactants can vary anywhere from few tenths of a percent to 25 weight percent or more of the succinate material used when the succinate is the primary surface-active agent used in the miscible flooding process.

When the succinate is used as an additive component in an aqueous mixture containing another anionic surfactant, the concentration of the succinate will vary depending upon its molecular weight, reservoir conditions and type of other anionic surfactant used, anywhere from less than 1 to 200 or more percent by weight of the other anionic surfactant or surfactants. An effective amount of succinamate surface-active agent comprises about 1 to 15 weight percent of the aqueous fluid. The succinate can be present in the aqueous fluid in a weight ratio of succinate to anionic surfactant of from about 0.1 to about 1.5. Specifically, when the succinate material is incorporated with other surfactants, these materials can include materials such as the sulfonates produced from 700° to 1100° F. fractions of crude oil as described in U.S. Pat. No. 3,302,713; overbased alkyl aromatic-type sulfonates as described in U.S. Pat. No. 3,965,984; petroleum sulfonates having specific ratios of aliphatic to aromatic protons as described in U.S. Pat. No. 3,997,451; and other alkyl aromatic ether sulfonates, especially those described in U.S. Pat. No. 3,977,471; and other surfactants well known to those in the art.

In instances in which the succinate material described above is itself used in an aqueous mixture as the primary surfactant for treating a reservoir, or in instances in which the succinate is added to an anionic surfactant, it is preferable that the aqueous mixture containing the surfactant be followed by a mobility buffer slug. The mobility buffer slug is preferably an aqueous solution containing a mobility reducing agent such as partially hydrolyzed high molecular weight polyacrylamides, high molecular weight polyalkylene oxide polymers, high molecular weight acrylamide polymers containing sulfo groups, copolymers of sodium acrylate or sodium methacrylate and acrylamide, biopolymers especially the polysaccharides, and other materials well-known in the art. The conditions under which these mobility buffers slugs are used will vary depending upon the reservoir conditions. In view of the well-known use of such materials, it is not necessary to further explain the specific manner in which these materials are used.

A water-drive can be injected into the reservoir to displace the aqueous mixture which contains the succinate either as the primary surfactant or in combination with an anionic surfactant.

The following examples are presented to illustrate specific embodiments of the present invention and should not be used to unduly limit the scope of the claims.

EXAMPLE I

In this example various succinates were used as surfactants in sodium chloride solutions having varying concentrations of brine. A vial screening method was used to determine general operability of the succinates as surfactants.

The aqueous solutions used for testing were made by dissolving four to five grams of the indicated succinate in about 45 grams of brine. The brines possessed sodium chloride salinities ranging from 0.2 N to 1.7 N. In some cases cosurfactants were added to adjust fluid stability in the indicated weight ratios.

The individual succinates were produced by reacting polybutenes having the indicated average molecular weight with maleic anhydride. The resulting polybutene succinic anhydrides were then reacted with the indicated alcohol to give an intermediate half-acid, half-ester. This material was then neutralized with caustic to give the indicated succinate.

The vial screening method was performed by placing 20 grams of an aqueous solution containing the succinate surfactant in a small vial. Then 2 grams of a crude oil (Salt Creek, Second Wall Creek Field in Wyoming) was placed in the vial. The vial was then gently turned over and it was observed whether or not the crude goes into the aqueous surfactant mixture or drops out of the solution entirely. The latter observation is indicative of a very high interfacial tension between the crude and aqueous surfactant phases and would generally indicate a poor recovery potential for crude from the pore volume of a subterranean formation.

If the crude and aqueous phases dissolve in each other or smear together then a low interfacial tension between the two phases can be predicted and an excellent miscibility rating is given. If some oil drops out of the aqueous solution a borderline miscibility rating is given. The miscibility of crude and aqeuous surfactant phases will sometimes fall between the two extremes and with a certain amount of skill can be generally given a moderate qualification as to interfacial tension with the crude.

The Table below indicates the relative range of miscibilities to the indicated brine concentrations. Unless otherwise noted, the surfactants tested were sodium succinates and were mixed in the indicated weight ratios with an ethoxylated cocoamine sold under the trade name "Armak C/25 Ethomeen." The $R_1$ substituents were polybutene having the indicated average molecular weights while the $R_2$ substituents were the indicated radicals. The general structure of the succinates is shown below:

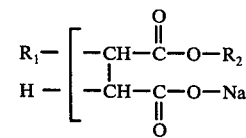

TABLE I

| Average Molecular Weight of $R_1$ | $R_2$ | Weight Ratio, Succinate to Cosurfactant | Brine Concentration (N) | | | | | | | |
|---|---|---|---|---|---|---|---|---|---|---|
| | | | 0.2 | 0.4 | 0.6 | 0.8 | 1.0 | 1.2 | 1.4 | 1.7 |
| 280 | Amyl Alcohol + EO[A] | — | High Interfacial Tension, Dropped Oil | | | | | | | |
| 320 | Amyl Alcohol + EO | — | High Interfacial Tension, Dropped Oil | | | | | | | |
| 420 | Amyl Alcohol + EO | — | High Interfacial Tension, Dropped Oil | | | | | | | |
| 280 | n-Propyl | — | High Interfacial Tension, Dropped Oil | | | | | | | |
| 320 | n-propyl | 6.7/1 | — | | | | | | | |
| 320 | n-Propyl | 5/1 | | — | — | — | | | | |
| 320[B] | —CH$_2$CH$_2$OH | 10/1 | — | — | — | | | | | |
| 340 | n-Propyl | 15/1 | | — | ..... | | | | | |
| 340 | n-Propyl | 10/1 | | | | ..... | | | | |
| 340 | —CH$_2$CH$_2$OH | 8/1 | — | — | — | — | | | | |
| 320 | i-Propyl | 15/1 | | — | | | | | | |
| 320 | i-Propyl | 10/1 | | — | — | | | | | |
| 320 | i-Propyl | 6.7/1 | | | | | ..... | — | — | |
| 320 | n-Butyl | 20/1 | — | | | | | | | |
| 320 | n-Butyl | 15/1 | | — | | | | | | |
| 320 | n-Butyl | 10/1 | | — | — | | | | | |
| 320 | n-Butyl | 6.7/1 | | | | | | ..... | ..... | |

[A]Ethoxylated amyl alcohol
[B]Cosurfactant was a mixed amyl alcohol sold by Amoco Chemicals Corp.
— Excellent Miscibility
..... Borderline Miscibility

EXAMPLE II

In this example three micellar solutions were made from a sodium salt of a polybutene sulfonate and, where indicated, a succinate material. The sulfonate was about 49 percent active sulfonate, and had an average equivalent weight in the range of from about 400–450 with the equivalent weight ranging from about 200 to about 1000.

Each solution was made by adding 5.3 grams of the above polybutene sulfonate to 50 grams of a sodium chloride brine having a specified sodium chloride concentration. To this solution was added 8 ppt, based on the brine, of a 6-mole ethoxylated hexyl alcohol co-surfactant. In instances where a succinate was incorporated into the solution, the polybutene sulfonate quantity was reduced by the amount of succinate added. The base solutions are identified below:

| Solution I | 0.3 N Brine |
| Solution II | 0.4 N Brine |
| Solution III | 0.6 N Brine |

EXAMPLE III

In this example viscosity measurements were made on mixtures of the polybutene sulfonate of Example II containing various succinates and were compared to solutions containing the polybutene sulfonate alone.

The viscosity measurements were made with a Brookfield spinning viscometer having a Thermosel attachment for performing tests at 140° F. (62° C.) using a No. 18 spindle.

The succinates used were prepared generally as described and had the following structural formula:

Succinate A

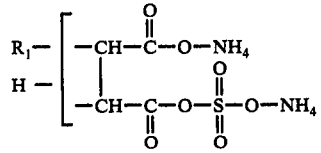

where $R_1$ is polybutene having an average molecular weight of about 320. This material is prepared by reacting a polybutene having an average molecular weight of about 320 with maleic anhydride. The resulting polybutene succinic anhydride is then reacted with sulfuric acid and thereafter neutralized with ammonium hydroxide.

Succinate B

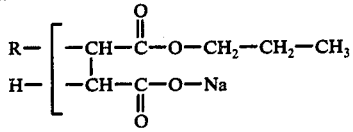

where $R_1$ is polybutene having an average molecular weight of about 420. This material was prepared by reacting the respective polybutene succinic anhydride with n-propanol and thereafter neutralizing the product with sodium hydroxide.

Succinate C

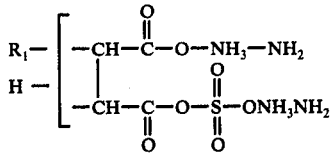

Where $R_1$ is polybutene having an average molecular weight of about 500. This material was produced by reacting the respective polybutene succinic anhydride with sulfuric acid and then reacting this product with hydrazine.

TABLE II

| Micellar Fluid Description | | Viscosity (CPS) Using Brookfield No. 18 Spindle | | | | | |
|---|---|---|---|---|---|---|---|
| Solution Grams Polybutene Sulfonate | Succinate Description and Grams | 140° F. | | | Room Temp. | | |
| | | 6rpm | 12rpm | 30rpm | 1.5rpm | 3rpm | 6rpm |
| I | 5.3 | — | — | 26 | 17 | — | — | — |
| I | 4.1 | 1.2 g. of A | — | 45 | 29 | — | — | — |
| II | 5.3 | — | — | 29 | 17 | — | — | — |
| II | 4.1 | 1.2 g. of A | — | 35 | 20 | — | — | — |
| II | 4.1 | 1.2 g. of B | 51 | 34 | 20 | 232 | 184 | 94 |
| II | 4.1 | 1.2 g. of C | 54 | 36 | 17 | 85 | 50 | 32 |
| III | 5.3 | — | — | 20 | 16 | — | — | — |
| III | 4.1 | 1.2 of A | — | 46 | 29 | 392 | 200 | 100 |
| III | 4.1 | 1.2 of B | 55 | 42 | 25 | 400 | 200 | 100 |
| III | 4.1 | 1.2 of C | 53 | 18 | 9 | 94 | 114 | 100 |

EXAMPLE IV

In this Example the viscosity for base solutions II and III was measured at various shear rates at 140° F. and compared with a fluid which contained 4.1 g. polybutene sulfonate and 1.2 g. of succinate B.

TABLE III

| Fluid Description | Shear Rate (Sec.$^{-1}$) | Viscosity (CPS) |
|---|---|---|
| Solution II (5.3 g. Polybutene Sulfonate) | 7 | 31 |
| " | 16 | 25 |
| " | 40 | 18 |
| " | 80 | 12 |
| Solution II (4.1 g. Polybutene Sulfonate + 1.2 g. Succinate B) | 7 | 51 |
| " | 16 | 35 |
| " | 40 | 22 |
| " | 80 | 13 |
| Solution III (5.3 g. Polybutene Sulfonate) | 7 | 22 |
| " | 16 | 20 |
| " | 40 | 16 |
| " | 80 | 13 |
| Solution III (4.1 g. Polybutene Sulfonate + 1.2 g. Succinate B) | 7 | 55 |
| " | 16 | 42 |
| " | 40 | 25 |
| " | 80 | 15 |

We claim as our invention:

1. A method for recovering oil from and oil-bearing formation which comprises injecting into the formation an aqueous fluid to displace the oil in the formation containing from 1 to 15 weight percent based on the aqueous fluid of a water soluble succinate surface-active agent having the following general formula:

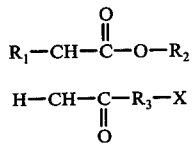

wherein $R_1$ is alkenyl having an average molecular weight in the range of from about 150 to about 600; $R_2$ is selected from the group consisting NH$_4$, metal cations, lower alkyls, hydroxyl-substituted lower alkyls and hydroxyl-substituted ethoxylated lower alkyls; $R_3$ is selected from the group consisting of O or O—SO$_3$; and X is a cation.

2. The process of claim 1 further characterized in that $R_1$ is a polymer derived from the polymerization of butene.

3. The process of claim 1 further characterized in that $R_1$ is a polymer derived from the polymerization of propene.

4. The process of claim 1 further characterized in that $R_1$ is an aliphatic polymer derived from the polymerization of olefins having from 3 to about 6 carbon atoms per molecule.

5. The process of claim 2 further characterized in that $R_1$ has an average molecular weight in the range of from about 200 to about 500.

6. The process of claim 2 further characterized in that $R_1$ has an average molecular weight about 280.

7. The process of claim 2 further characterized in that $R_1$ has an average molecular weight about 320.

8. The process of claim 2 further characterized in that $R_1$ has an average molecular weight at about 340.

9. The process of claim 2 further characterized in that $R_1$ has an average molecular weight at about 420.

10. The process of claim 1 further characterized in that $R_2$ is a lower alkyl selected from the group consisting of methyl, ethyl, propyl, butyl, and pentyl.

11. The process of claim 1 further characterized in that $R_2$ is B-hydroxyethyl.

12. The process of claim 1 further characterized in that X is selected from the group consisting of sodium, potassium, lithium, ammonium, RNH$_3$,

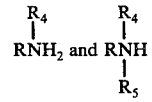

where R, $R_4$ and $R_5$ are selected from lower alkyl.

13. The process of claim 1 further characterized in that $R_1$ comprises a polymer derived from butene having an average molecular weight in the range of from about 200 to about 500; $R_2$ is selected from alkyls having less than six carbon atoms per molecule; and X is selected from the group consisting of sodium and ammonium.

14. In a method of recovering oil from an oil-bearing formation which comprises injecting into the formation an aqueous fluid to displace the oil in the formation containing an effective amount of an anionic sulfonate surfactant, the improvement which comprises incorporating into the aqueous fluid, from 1 to 15 percent based on the aqueous fluid of a water soluble succinate surface-active agent having the following general formula:

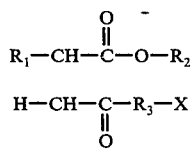

wherein $R_1$ is alkenyl having an average molecular weight in the range of from about 150 to about 600; $R_2$ is selected from the group consisting of $NH_4$, lower alkyls, hydroxyl-substituted lower alkyls, hydroxyl-substituted ethoxylated lower alkyls; $R_3$ is O or $O—SO_3$; and X is a cation.

15. The process of claim 14 further characterized in that $R_1$ is a polymer derived from the polymerization of butene.

16. The process of claim 14 further characterized in that $R_1$ is a polymer derived from the polymerization of propane.

17. The process of claim 14 further characterized in that $R_1$ is an aliphatic polymer derived from the polymerization of olefins having from 3 to about 6 carbon atoms per molecule.

18. The process of claim 15 further characterized in that $R_1$ has an average molecular weight in the range of from about 200 to about 500.

19. The process of claim 15 further characterized in that $R_1$ has an average molecular weight about 280.

20. The process of claim 15 further characterized in that $R_1$ has an average molecular weight about 320.

21. The process of claim 15 further characterized in that $R_1$ has an average molecular weight at about 340.

22. The process of claim 15 further characterized in that $R_1$ has an average molecular weight at about 420.

23. The process of claim 14 further characterized in that $R_2$ is a lower alkyl selected from the group consisting of methyl, ethyl, propyl, butyl, and pentyl.

24. The process of claim 14 further characterized in that $R_2$ is B-hydroxyethyl.

25. The process of claim 14 further characterized in that X is selected from the group consisting of sodium, potassium, lithium, ammonium, $RNH_3$,

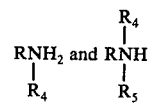

where R, $R_4$ and $R_5$ are selected from lower alkyl.

26. The process of claim 14 further characterized in that said succinate surface-active agent is present in said aqueous fluid in a weight ratio of succinate to anionic surfactant agent of from about 0.1 to about 1.5

27. The process of claim 14 further characterized in that $R_1$ comprises a polymer derived from butene having an average molecular weight in the range of from about 200 to about 500; $R_2$ is selected from alkyls having less than six carbon atoms per molecule; and X is selected from the group consisting of sodium and ammonium.

* * * * *

UNITED STATES PATENT OFFICE
CERTIFICATE OF CORRECTION

Patent No. 4,122,020                    Dated   October 24, 1978

Inventor(s)   Joseph J. Valcho and Robert E. Karll

It is certified that error appears in the above-identified patent and that said Letters Patent are hereby corrected as shown below:

| Patent Col. | Line | |
|---|---|---|
| 3 | 33 | "hydroxy-substituted" should read -- hydroxyl-substituted -- |
| 3 | 44 | "for for" should read -- for -- |
| 4 | 44 | "amines $NH_3NH_2+$," should read -- amines, $NH_3NH_2+$ -- |
| 4 | 47 | "$NH_3NH_2+$, ammonium, $RNH_3-$," -- omit; they repeated this phrase -- |
| 4 | 56 | "os" should read -- of -- |
| Table 1 | | needs a _____ under 0.6 across from 6. 7/1 |

UNITED STATES PATENT OFFICE
CERTIFICATE OF CORRECTION

Patent No. 4,122,020          Dated October 24, 1978

Inventor(s) Joseph J. Valcho and Robert E. Karll

It is certified that error appears in the above-identified patent and that said Letters Patent are hereby corrected as shown below:

| | | |
|---|---|---|
| Table II | | "Solution" should be separate from "Grams Polybutene sulfonate" |
| 9 | 29 | "77" should be -- 7 -- |
| 9 | 40 | "and" should be -- an -- |
| 9 | 56 | "consisting $NH_4$" should read -- consisting of $NH_4$ -- |
| 10 | 58 | "15 percent" should read -- 15 weight percent -- |

UNITED STATES PATENT OFFICE
CERTIFICATE OF CORRECTION

Patent No. 4,122,020  Dated October 24, 1978

Inventor(s) Joseph J. Valcho and Robert E. Karll

It is certified that error appears in the above-identified patent and that said Letters Patent are hereby corrected as shown below:

Patent
Col. Line 9 46-52
and
10 60-68

(In claims 1 and 14

$$R_1-CH-\overset{\overset{O}{\|}}{C}-O-R_2$$
$$H\ -CH-\underset{\underset{O}{\|}}{C}-R_3-X$$

formula should be shown as:

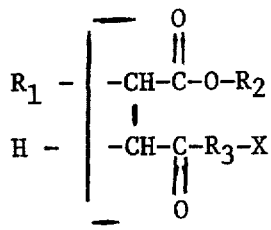

$$R_1 - \left[\begin{array}{c} -CH-\overset{\overset{O}{\|}}{C}-O-R_2 \\ | \\ -CH-\underset{\underset{O}{\|}}{C}-R_3-X \end{array}\right]$$
$$H -$$

Signed and Sealed this

*Eleventh* Day of *September 1979*

[SEAL]

Attest:

Attesting Officer

LUTRELLE F. PARKER
*Acting Commissioner of Patents and Trademarks*